(12) United States Patent
Howell et al.

(10) Patent No.: US 11,652,887 B2
(45) Date of Patent: *May 16, 2023

(54) DYNAMIC ONLINE GAME IMPLEMENTATION ON A CLIENT DEVICE

(71) Applicant: Kabam, Inc., San Francisco, CA (US)

(72) Inventors: Jeff Howell, Vancouver (CA);
Benjamin Talbot, Vancouver (CA);
Russell Warneboldt, Vancouver (CA)

(73) Assignee: Kabam, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/707,698

(22) Filed: Mar. 29, 2022

(65) Prior Publication Data
US 2022/0224773 A1    Jul. 14, 2022

Related U.S. Application Data

(63) Continuation of application No. 17/173,205, filed on Feb. 10, 2021, now Pat. No. 11,303,730, which is a (Continued)

(51) Int. Cl.
*H04L 67/131* (2022.01)
*H04L 67/303* (2022.01)
(Continued)

(52) U.S. Cl.
CPC .......... *H04L 67/131* (2022.05); *A63F 13/30* (2014.09); *A63F 13/355* (2014.09);
(Continued)

(58) Field of Classification Search
CPC ........ A63F 13/30; A63F 13/358; A63F 13/77; A63F 13/355; H04L 67/01; H04L 67/131; H04L 67/303
See application file for complete search history.

(56) References Cited

U.S. PATENT DOCUMENTS 6,755,742 B1    6/2004  Hartman
8,257,177 B1    9/2012  Saund
(Continued)

FOREIGN PATENT DOCUMENTS

CA    2498789    3/2004

*Primary Examiner* — Jeong S Park
(74) *Attorney, Agent, or Firm* — Esplin & Associates, PC (57) ABSTRACT

A system and method for providing online games on client devices based on capabilities of the client devices are disclosed. Device capability information may be obtained from the client devices during the online game. Values of one or more capability parameters may be determined based on the device capability information obtained. Device profiles may be assigned to the client devices based on the determined values of the capability parameters. One or more game features may be adjusted in accordance with the assigned device profile for implementing the online game on the client devices. The adjustable game features may include frame rate, level of detail of rendering, level of 3D graphics, level of collision effects, animation type, gameplay available for user interaction, gameplay content for user interaction, communication mode, physics effects available for display, level of artificial intelligence, and/or any other features of the online game.

18 Claims, 5 Drawing Sheets

Related U.S. Application Data continuation of application No. 16/685,075, filed on Nov. 15, 2019, now Pat. No. 10,938,959, which is a continuation of application No. 16/245,123, filed on Jan. 10, 2019, now Pat. No. 10,498,860, which is a continuation of application No. 14/965,733, filed on Dec. 10, 2015, now Pat. No. 10,193,999.

(51) Int. Cl.
*A63F 13/355* (2014.01)
*A63F 13/30* (2014.01)
*A63F 13/77* (2014.01)
*A63F 13/358* (2014.01)
*H04L 67/01* (2022.01)

(52) U.S. Cl.
CPC ............ *A63F 13/358* (2014.09); *A63F 13/77* (2014.09); *H04L 67/01* (2022.05); *H04L 67/303* (2013.01)

(56) References Cited

U.S. PATENT DOCUMENTS

| | | | |
|---|---|---|---|
| 8,267,792 B2 | 9/2012 | Buchholz | |
| 8,366,554 B1 | 2/2013 | Yuan | |
| 9,168,459 B1 | 10/2015 | Delaet | |
| 9,440,143 B2* | 9/2016 | Wakeford | A63F 13/35 |
| 9,539,509 B2 | 1/2017 | Delaet | |
| 9,623,322 B1* | 4/2017 | Wakeford | A63F 13/77 |
| 9,744,454 B1 | 8/2017 | Delaet | |
| 10,193,999 B1* | 1/2019 | Howell | A63F 13/358 |
| 10,498,860 B2* | 12/2019 | Howell | A63F 13/30 |
| 10,702,780 B2 | 7/2020 | Howell | |
| 10,709,977 B2 | 7/2020 | Delaet | |
| 10,938,959 B2* | 3/2021 | Howell | A63F 13/355 |
| 11,303,730 B2* | 4/2022 | Howell | H04L 67/303 |
| 2003/0031062 A1 | 2/2003 | Tsurugai | |
| 2006/0079329 A1 | 4/2006 | Yamada | |
| 2006/0189388 A1 | 8/2006 | Hartman | |
| 2007/0294387 A1 | 12/2007 | Martin | |
| 2008/0057894 A1 | 3/2008 | Aleksic | |
| 2008/0146338 A1 | 6/2008 | Bernard | |
| 2009/0197684 A1 | 8/2009 | Arezina | |
| 2010/0004045 A1 | 1/2010 | Roemer | |
| 2010/0135544 A1* | 6/2010 | Mattiuzzi | G06T 7/35 382/128 |
| 2010/0162207 A1 | 6/2010 | Nathan | |
| 2011/0086701 A1 | 4/2011 | D'Amico | |
| 2011/0263332 A1 | 10/2011 | Mizrachi | |
| 2012/0015740 A1 | 1/2012 | Vanbragt | |
| 2012/0036003 A1 | 2/2012 | Tong | |
| 2012/0123570 A1 | 5/2012 | Guinn | |
| 2012/0283008 A1 | 11/2012 | Martone | |
| 2013/0172076 A1 | 7/2013 | Bramble | |
| 2013/0225282 A1 | 8/2013 | Williams | |
| 2013/0273996 A1 | 10/2013 | Froy | |
| 2013/0303288 A1 | 11/2013 | Mccoy | |
| 2013/0304584 A1* | 11/2013 | McCoy | G06Q 30/02 705/14.66 |
| 2013/0310084 A1 | 11/2013 | Irish | |
| 2013/0316811 A1 | 11/2013 | Azuma | |
| 2013/0324056 A1 | 12/2013 | Maguire | |
| 2013/0326374 A1* | 12/2013 | Harvey | A63F 13/75 715/756 |
| 2014/0039990 A1 | 2/2014 | Ken | |
| 2014/0258474 A1* | 9/2014 | Kim | H04W 4/70 709/219 |
| 2014/0370969 A1 | 12/2014 | Lemay | |
| 2015/0005055 A1 | 1/2015 | Alderucci | |
| 2015/0011277 A1* | 1/2015 | Wakeford | A63F 13/35 463/1 |
| 2015/0045105 A1 | 2/2015 | Leslie | |
| 2015/0194013 A1 | 7/2015 | Herold | |
| 2016/0038835 A1 | 2/2016 | Delaet | |
| 2016/0292810 A1* | 10/2016 | Fine | H04L 65/765 |
| 2016/0309292 A1 | 10/2016 | Kerr | |
| 2017/0103410 A1 | 4/2017 | Kerr | |
| 2018/0365935 A1 | 12/2018 | Howell | |
| 2019/0143210 A1 | 5/2019 | Delaet | |
| 2019/0149637 A1 | 5/2019 | Howell | |
| 2020/0084298 A1 | 3/2020 | Howell | |
| 2020/0330865 A1 | 10/2020 | Delaet | |
| 2020/0330879 A1 | 10/2020 | Howell | |
| 2021/0176343 A1 | 6/2021 | Howell | |

* cited by examiner

DYNAMIC ONLINE GAME IMPLEMENTATION ON A CLIENT DEVICE

FIELD OF THE DISCLOSURE

This disclosure relates to dynamically providing online games on client devices based on client device capabilities.

BACKGROUND

Facilitating a user to configure settings of a computer game is generally known in the art. Conventionally, an interface is provided to the user to configure certain settings, such as 3D graphics, rendering detail, audio quality, or selective content in the game. For example, a settings interface is typically provided to the user on conventional systems to enable the user to turn on or off 3D graphical effects in a computer game. The user may configure such a feature of the computer game based on the user's knowledge of the conventional systems. As an improvement, some conventional systems only present game features that are supported by the systems. For example, in those systems, if the graphics processing unit (GPU) employed by the systems lack 3D graphics processing capability, the systems do not present an option for the user to turn on 3D graphics effects feature of game in the settings interface.

Assigning a device profile to a computer device based on the client device capabilities is generally known in the art. The conventional techniques typically determines a set of device capabilities of a client device at a predetermined time, e.g., at the startup of the client device. The conventional techniques then matches the determined set of device capabilities of the client device to a predefined device profile that includes this set of device capabilities; and assigns the matched device profile to the client device.

SUMMARY

One aspect of the disclosure relates to providing online games on individual client devices based on capability of the client devices. For achieving this, device capability information regarding individual client devices may be dynamically obtained at desired points of time during the online game. The obtained device capability information regarding a given client device may include information indicating a first set of device capabilities of the given client device, such as specified processing power, current processing capacity, specified graphics processing capability, current graphics processing capacity, specified display capability, specified multimedia processing capability, current transmission speed, battery power remaining, and/or any other capability of the given client device. Based on the device capability information obtained for the given client device, values of one or more capability parameters may be determined for the given client device. Based on the values of the one or more capability parameters, a device profile may be assigned to the given client device. One or more features of the online game may be adjusted in accordance with the device profiles assigned to the client devices for implementing the online game on the client devices. For example, without limitation, rendering rate, frame rate, game content to be implemented or presented, audio quality, effects enabled and/or any other features of the online game may be adjusted in accordance the assigned device profiles. This may enhance user experience with the online game as the online game may be implemented on the client device optimally in accordance with the capabilities of the client device. As compared to the conventional systems described above, this enables dynamic game implementation on client devices without requiring user intervention.

Another aspect of the disclosure relates to determining a device profile for a client device using one or more capability parameters. For such a determination, values of the one or more capability parameters may be determined based on device capability information obtained for the client device. The determined values of the one or more capability parameters may be compared with corresponding threshold values predefined by provider, administrator, moderator, and/or any other entities related to the online game. A device profile may be assigned to the client device based on the threshold values breached by the determined values of the one or more capability parameters. In some examples, the aforementioned assignment is based on weighted sum of the threshold values breached. In some examples, the aforementioned assignment may be based on differences between the values of the one or more capability parameters and the corresponding threshold values breached. In some examples, the aforementioned assignment is based on a quantity of the threshold values breached. In some examples, the aforementioned assignment may be based on a priority list of threshold values as predetermined by the provider, administrator, moderator, and/or any other entities related to the online game. In some examples, the client device may be assigned a different device profile based on one or more changes in the values of capability parameters as compared to a previous device profile assigned to the client device. For example, the device capability information regarding the client device may be intermittently obtained during the online game; changes of values of the capability parameters may be detected; and in response to the detected changes, a different device profile may be assigned to the client device. This enhances device profile assignment for a client device.

The game component may be configured to execute an instance of an online game. The game component may be configured to transmit information to individual client devices for implementation or presentation of the instance of the online game on the individual client devices for user interaction. The individual client devices include a first client device such that the instance of the online game executed by the game component is implemented or presented on the first client device for user interaction. One or more features of the instance of the online game executed by the game component may be dynamically implemented and provided on the first client device in accordance with a device profile assigned to the first client device.

The device information component may be configured to obtain device capability information regarding capabilities of the client devices. Obtaining device capability information from the client devices by the device information component may involve communicating with the client devices, detecting if the client devices have transmitted information indicating their capabilities, paring such information, and/or any other operations. In some implementations, the device information component may be configured to passively receive the device capability information from the client devices in a "push" mode. For example, in those implementations, a client device may be configured to push its device capability information to the device information component to process the device capability information. In some implementations, the device information component may be configured to activity obtain the device capability information from the client device in a "poll" mode. For example, in those implementations, the device information component may send a request to the client device for obtaining the device capability information regarding the client device at a predetermined stage of the online game. In some implementations, the device information component may be configured to intermittently obtain the device capability information from a client device.

The device capability determination component may be configured to determine values of capability parameters for a client device based on the device capability information obtained from the client device. A set of capability parameters may be configured into the device capability information component or may be obtained device capability information component. The device capability determination component may be configured to examine the device capability information obtained by the device information component, extract information relevant to the set of capability parameters from the device capability information, determine the values for the capability parameters in the set, and/or any other operations.

The device profile management component may be configured to manage device profiles for assignment to individual client devices. The device profiles managed by the device profile management component may specify corresponding threshold values for the capability parameters.

The device profile assignment component may be configured to determine one or more values of the capability parameters for the client device have breached corresponding threshold values included in a given device profile managed by the device profile management component. The determination by the device profile assignment component may involve comparing the values of the capability parameters with corresponding threshold values. The device profile assignment component may be configured to assign device profile to a client device based on the determination that one or more values of capability parameters determined for the client device have breached corresponding threshold values specified a given device profile. In some implementations, the device profile assignment component may be configured to use weighted sum of the determined values of the capability parameters to assign the device profile. In some implementations, a subset of threshold values specified in a given device profile may be used by the device profile assignment component for assigning the given device profile. In some implementations, the device profile assignment component may assign the device profile to the client device based on differences of between the values of the capability parameters determined for the client device and corresponding threshold values specified in the device profile.

The adjustment component may be configured to adjust runtime features of the online game for a given client device in accordance with the device profile assigned to the given device profile. For achieving this, a set of online game features may be associated with the given device profile such that the features of the online game is provided on the client device in accordance with those features with the device profile that is assigned to the client device. Some examples of adjustable game features may include frame rate, level of detail of rendering, level of 3D graphics, level of collision effects, animation type, gameplay available for user interaction, gameplay content for user interaction, communication mode, physics effects available for display, level of artificial intelligence, and/or any other features of the online game.

These and other features and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
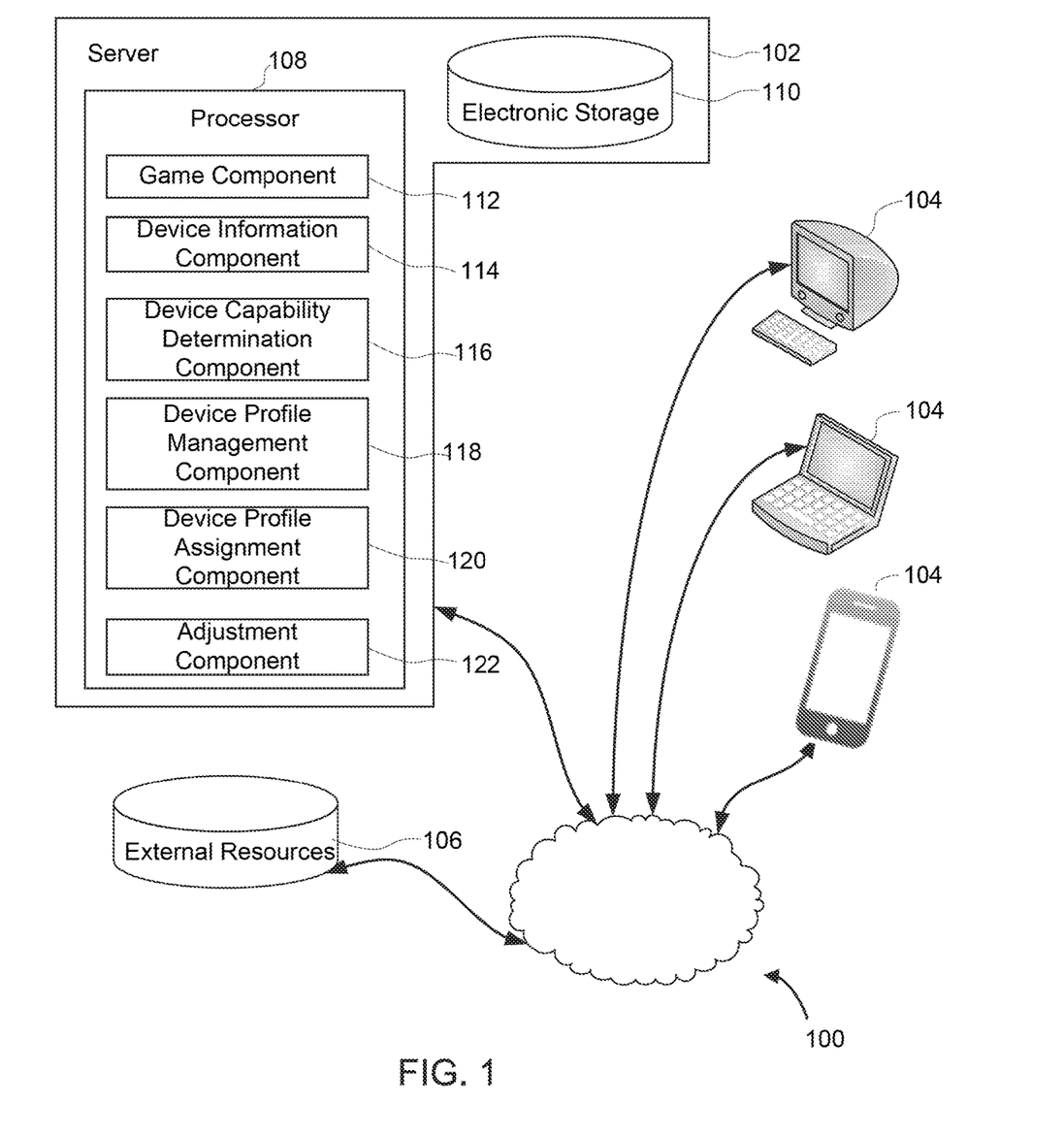
FIG. 1 illustrates one example of a system configured to provide online games on individual client devices based on capability of the client devices in accordance with the disclosure.

FIG. 1 illustrates one example of a system 100 configured to facilitate providing online games on individual client devices based on capability of the client devices in accordance with the disclosure. In some implementations, as shown in this example, system 100 may include a server 102 configured to host online game over a communications network. As shown, the server 102 may communicate with one or more client devices 104 according to a client/server architecture. The users may access system 100 via client devices 104. As shown, server 102 may comprise processors 108 configured to execute computer-readable instructions to implement system components. The computer program components may include one or more of a game component 112, a device information component 114, a device capability determination component 116, a device profile management component 118, a device profile assignment component 120, an adjustment component 122, and/or other components.

The game component 112 may be configured to execute an instance of an online game. The instance of the online game executed by the game component 112 may be implemented by client devices 104 for presentation to and interaction by the users of the online game. Within the instance of the online game executed by the game component 112, users may interact with elements in the online game and/or with each other through gameplays provided by the online game. The gameplays may include role-playing, first-person shooter, real-time strategy, turn-based strategy, simulation, music or rhythm playing, card playing, board game, social interaction, twitching, and/or any other gameplays. The execution of the instance of the online game by game component 112 may include determining a state associated with the online game. The state may be communicated (e.g., via streaming visual data, object/position data, and/or other state information) from server 102 to client devices 104 for presentation to users. The state determined and transmitted to a given client device 104 may correspond to a view for a user character being controlled by a user via the given client device 104. The state determined and transmitted to a given client device 104 may correspond to a location in a game space associated with the online game. The view described by the state for the given client device may correspond, for example, to the location from which the view is taken, the location the view depicts and/or other locations, a zoom ratio, a dimensionality of objects, a point-of-view, and/or view parameters of the view. One or more of the view parameters may be selectable by the user.

The instance of the online game may be persistent. That is, the online game may continue on whether or not individual users are currently logged in and/or participating in the online game. A user that logs out of the online game and then logs back in some time later may find the game space associated with the online game has been changed through the interactions of other users with the game space during the time the user was logged out. These changes may include changes to the simulated physical space, changes in the user's inventory, changes in other users' inventories, changes experienced by non-user characters, and/or other changes.

The instance of the online game may comprise a simulated game space, e.g., a game space that is accessible by users via clients (e.g., client devices 104) that present the views of the game space to a user. The game space may have a topography, express ongoing real-time interaction by one or more users, and/or include one or more objects positioned within the topography that are capable of locomotion within the topography. In some instances, the topography may be a two-dimensional topography. In other instances, the topography may be a three-dimensional topography. The topography may include dimensions of the space and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). The instance executed by the computer components may be synchronous, asynchronous, and/or semi-synchronous.

The instance of the online game may comprise game space entities automatically controlled in the instance of the online game. Such game space entities may not be associated with any user. As such, the automatically controlled game space entities may be generated and/or developed by artificial intelligence configured with the server 102 by provider(s), administrator(s), moderator(s), and/or any other entities related to the online game. These automatically controlled entities may evolve within the game space associated with the online game free from user controls and may interact with the entities controlled by or associated with the users, other automatically controlled game space entities, as well as the topography of the game space. Certain manifested traits may be associated with the automatically controlled entities in accordance with the artificial intelligence configured with the server 102.

The above description of the manner in which the state of the game space associated with the online game as determined by game component 112 is not intended to be limiting. The game component 112 may be configured to express the game space in a more limited, or richer, manner. For example, views determined for the game space representing the state of the instance of the game space may be selected from a limited set of graphics depicting an event in a given place within the game space. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other expressions of individual places within the game space are contemplated. As another example, the game space may be simply expressed as a background for card playing actions, e.g., simple art depicting a table top. As yet another example, the game space may be expressed as a game board on which game pieces associated with the users may be moved.

Within the instance of the online game executed by game component 112, the users may participate in the instance of the online game by controlling one or more of an element in the game space associated with the online game. The user-controlled elements may include avatars, game space characters, game space units (e.g., troops), objects (e.g., weapons, horses, vehicle and so on), simulated physical phenomena (e.g., wind, rain, earthquakes, and/or other phenomena), and/or other user-controlled elements. The user-controlled avatars may represent the users in the game space. The user characters may include heroes, knights, commanders, leaders, generals, and/or any other game space entities that may possess strength, skills, abilities, magic powers, knowledge, and/or any other individualized attributes. The game space units controlled by the user may include troops and/or any other game space entities that may be trained, recruited, captured, and/or otherwise acquired by the users in groups or en-mass. The objects controlled by the users may include weapons, vehicles, projectiles, magic items, wardrobes, boots, armor, knapsacks, medicine, healing potions, and/or any other virtual items that may be employed by the users for interaction within the online game.

In any case, the user-controlled elements may move through and interact with the game space (e.g., the automatically controlled entities, elements controlled by other users, and/or topography in the game space) associated with the online game. The elements controlled by a given user may be created and/or customized by the given user. The given user may have an "inventory" of virtual goods and/or currency usable within the game space.

Controls of virtual elements in the game space may be exercised through commands inputted by a given user through client devices 104. The given user may interact with other users through communications exchanged within the game space. Such communications may include one or more of textual chat, instant messages, private messages, voice communications, and other communications (if any). Communications may be received and entered by the users via their respective client devices 104. Communications may be routed to and from the appropriate users through server 102 (e.g., through game component 112).

A given user may input commands with specific parameters to undertake specific deeds, actions, functions, spheres of actions, and/or any other types of interactions within the game space. For example, the given user may input commands to construct, upgrade, and/or demolish virtual buildings; harvest and/or gather virtual resources; heal virtual user-controlled elements, automatically controlled entities, and/or elements controlled by other users; train, march, transport, reinforce, reassign, recruit, and/or arrange troops; attack, manage, create, demolish, and/or defend cities, realms, kingdoms, and/or any other game space locations controlled by or associated with the users; craft or transport virtual items; interact with and/or compete against or along with non-user entities and/or game space elements controlled by other users in combats; research technologies and/or skills; mine and/or prospect for virtual resources; complete missions, quests, and/or campaigns; exercise magic power and/or cast spells; draw and/or deal cards; move pieces on a game board; and/or perform any other specific deeds, actions, functions, or sphere of actions within the game space. In some examples, the given user may input commands to compete against elements in an environment within the game space—i.e., User vs. Environment (PvE) activities. In some examples, the given user may input commands to compete against each other within the game space—i.e., User vs. User (PvP) activities.

The game component 112 may be configured to execute user actions to facilitate interaction of the users with the game space and/or each other in response to receiving game space commands input by the users. Execution of the user action by the game component 112 may produce changes to the game state, which may reflect progression and/or results of the user actions. In some examples, state changes caused by the execution of the user actions may be recorded in the electronic storage 110 to facilitate persistency throughout the instance of the online game. In some examples, execution of the user actions may not produce persistent changes to the game state (e.g., a user character jumping forward and backward successively may not produce any perceivable game state changes to other users).

Within the instance of the game space, virtual currencies may be provided to store and/or exchange of game space values. Units of the virtual currencies (for example, gold, gem, silver, coin, token, and/or any other types of virtual currencies) may reflect game space values as determined by a provider, administrator, moderator, user, and/or any other entities related to the game space. Through one or more units of virtual currencies, game space values may be captured, stored, and circulated in the game space. As one non-limiting example, combinations of user actions, skills, virtual items, time, and/or any other game space elements may be captured, stored, and circulated through virtual currencies to reflect game space values created by user labor in interacting with the game space. For instance, a user may be provided 1,000 gems after prospecting and mining for the gems in the game space for a period of time with certain required mining equipment operable only by a skilled game space miner, which the user has expanded labor to become.

Within the instance of the game space executed by the game component 112, virtual currencies may be collected, earned, purchased, gifted, or otherwise acquired by the users. For example, the users may purchase the virtual currencies with real-world money consideration (e.g., credit payment through credit card, electronic vouchers provided by the provider of the online game, physical tokens, and/or any other types of real-world currencies) through a virtual store. The users may earn the virtual currencies, for example through gameplays provided in the game space (e.g., PvP activities, PvE activities, in-game tournaments, tasks, quests, missions, and/or any other gameplays in the game space). By way of non-limiting example, a given user may earn a predetermined amount of virtual currencies after completing an in-game task in the game space. In some examples, the provider of the online game may simply make a certain amount of virtual currencies available to the users, for instance through treasure troves in the game space such that the users may gratuitously collect the virtual currencies by exploring for the treasure troves. In some other examples, the users may acquire virtual currencies by receiving gifts that comprise virtual currencies from other users. One of ordinary skills in the art will appreciate that there are other ways for the users to acquire virtual currencies in the game space.

Within the instance of the game space executed by the game component 112, resources may be, for example, generated, cultivated, mined, harvested, purchased, earned, consumed, traded, and/or gifted over time by units, characters, pets, buildings, facilities, and/or any other infrastructure or entity in the game space for the user. Resources may be prospected. Resources may be virtual items of value that can be accumulated through participation in the game space, rather than virtual currencies that store values in the game space as described above. As such, resources may be used to satisfy resource requirements in the game space. By way of non-limiting examples, game space resources may include food (e.g., rice, fish, wheat, etc.), minerals (e.g., wood, iron, ore, coal, oil, stone, crystal, etc.), plants, animals, and/or any other resources appropriate for the game space. Transfer of resources between users may be reflected through user inventories such that the transferor user's inventory reduces an amount of the transferred resources that are added to the transferee user.

One or more features of the online game executed by the game component 112 may be dynamically implemented on client device 104. As will be described in great detail, the features of the online game may be dynamically implemented on client device 104 in accordance with a device profile assigned to the client device. The dynamically implemented features of the online game for a given client device 104 may include frame rate, level of detail for game rendering, level of 3D graphics effects, level of collision effects, type of animation, gameplay available for user interaction, game content available for user interaction, music available, communication mode, physics effects available for display, level of sound quality, level of artificial intelligence, frequency of game notifications, and/or any other features.

The device information component 114 may be configured to obtain device capability information regarding capabilities of the client devices. Obtaining device capability information from the client devices by the device information component 114 may involve communicating with the client devices 104, detecting if the client devices have transmitted information indicating their capabilities, paring such information, and/or any other operations. In some implementations, the device information component 114 may be configured to passively receive the device capability information from the client devices 104 in a "push" mode. For example, in those implementations, a client device 104 may be configured to push its device capability information to server 102. For instance, the client device 104 may be configured to collect various capability information at a predetermined stage of the online game (e.g., during the startup of the online game on the client device 104). In some implementations, the device information component 114 may be configured to activity obtain the device capability information from the client device in a "poll" mode. For example, in those implementations, the server 102 via device information component 114 may send a request to the client device 104 for obtaining the device capability information regarding the client device 104 at a predetermined stage of the online game.

In some implementations, the device information component 114 may be configured to intermittently obtain the device capability information from a client device 104. For example, the device information component 114 may be configured to obtain the device capability information periodically, e.g., once every hour. However, this is not necessarily the only case. In some examples, the device information component 114 may be configured to obtain the device capability information from the client device 104 in accordance with the user interaction with the online game. For example, the device information component 114 may be configured to obtain device capability information from the client device 104 when the user completes a first stage of the online game (e.g., complete a first event or a first chapter in the online game), and obtain the device capability information from the client device 104 when the user completes a second stage of the online game (e.g., complete a second event or a second chapter in the online game). By way of illustration, for example, the device information component 114 may be configured to obtain the device capability information from the client device 104 after the user has completed a first race track in the online game providing car race gameplays, and obtain the device capability information from the client device 104 after the user has completed a second race track in the online game.

Figure 2:
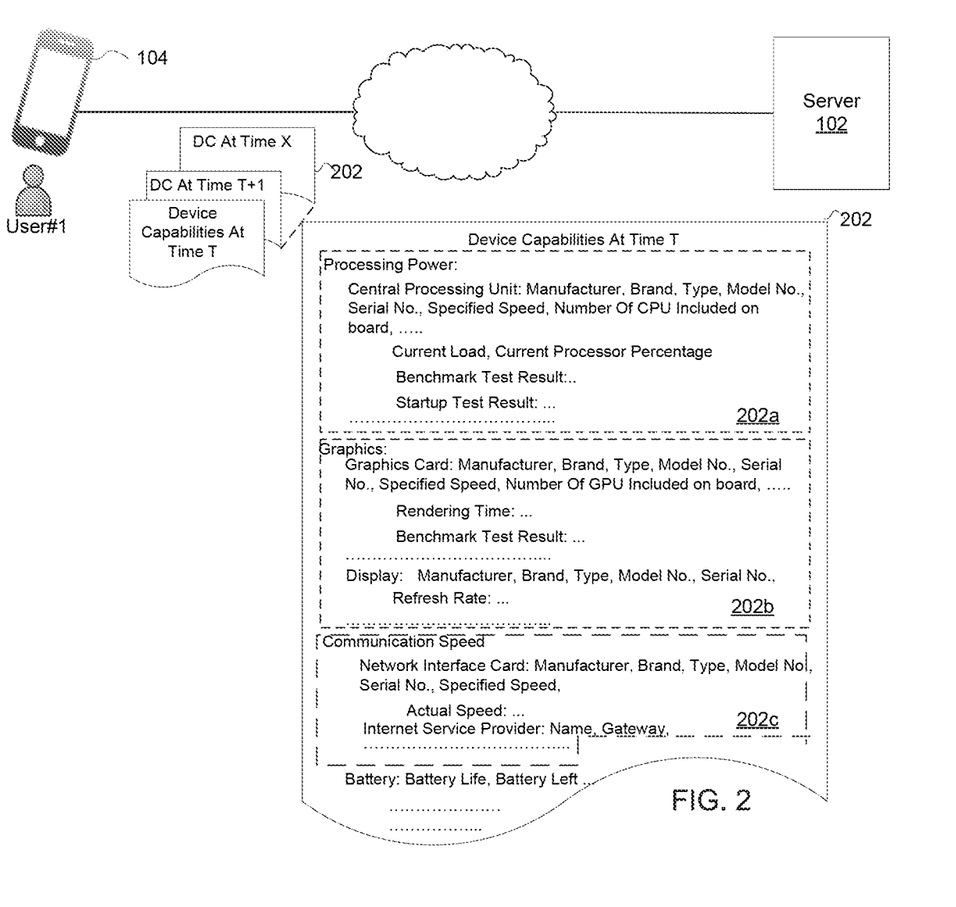
FIG. 2 illustrates one example of device capability information that may be obtained from the client device shown in FIG. 1.

FIG. 2 illustrates one example of device capability information that may be obtained from the client device 104. It will be described with reference to FIG. 1. As shown, the server 102 may obtain the device capability information regarding various capabilities of the client device 104 at various time points during the online game. As also shown, the device capability information 202 obtained by the server 102 at a given point of time T may include processing power information 202a, graphics information 202b, communication speed information 202c, battery information, and/or any other capability information. The processing power information 202a may reflect processing speed of one or more processors configured to execute machine-readable instructions on the client device 104. For example, the processing power information 202a may include various information regarding the manufacturer, brand, type, model number, serial number, specified speed, number of CPU (or Baseband Processor For Mobile Devices) included on board, and/or any other processor information that can be obtained from a specification provided by the provider(s) of the processor(s) on the client device 104. It should be noted such processing power information does not necessarily indicate the actual processing power of the client device 104, but rather is specified by the provider(s) of the processor(s). For the actual processing power of the client device 104, various information such as current CPU (or Baseband Processor For Mobile Devices) load, current percentage of CPU (or Baseband Processor For Mobile Devices) usage, current threads running in the CPU (or Baseband Processor For Mobile Devices), the number of processes running, processor time by individual process, total memory used by all running processes, and any other real-time information regarding the state of the processors on the client device 104 may be obtained from the client device 104. In some examples, as in this example, benchmark test may be run on the client device 104 to test various aspects of the processor(s) and the test result may be transmitted to the server 102 as part of the device capability information 202.

The graphics information 202b may include various information regarding the manufacturer, brand, type, model number, serial number, specified speed, number of graphics processing units (GPU) on board, and/or any other graphics processing information that can be obtained from a specification provided by the provided by the provider(s) of the GPU(s) on the client device 104. It should be noted such graphics information regarding the client device 104 does not necessarily indicate the actual graphics processing power of the client device 104, but rather is specified by the provider(s) of the graphics processor(s). For the actual graphics processing power of the client device 104, various information such as current GPU load, current rendering time, total memory used by the GPU, and any other real-time information regarding the state of the graphics processor(s) may be obtained from the client device 104. In some examples, as in this example, benchmark test may be run by the client device 104 to test various aspects of the processor(s) and the test result may be transmitted to the server 102 as part of the device capability information.

The communication speed information 202c may include various information indicating the network communication speed of the client device 104. For example, as shown, the communication speed information 202c may include various specified information regarding one or more network interface devices (e.g., WIFI, Bluetooth, Wired LAN and/or any other types of network interface cards) employed by the client device 104; may include specified link speed of the network interface cards; may include actual link speed as reported by the network interface cards; network utilization rate or percentage; and/or any other information regarding the network interface devices of the client device 104. In some examples, the results of network speed tests such as ping test between the client device 104 and the server 102 may be obtained to reflect communication speed of the client device 104. For instance, the client device 104 (or the server 102) may be configured to run the ping test to determine the round-trip data transmission speed on the network(s) between the server 102 and the client device 104. Other communication speed information regarding the client device 104 is contemplated.

Other device capability information that may be obtained from client device 104 may include battery information indicating specified battery capacity, battery power remaining and/or any other information regarding one or more batteries on the client device 104; display capability information indicating size of the display, refresh rate, type of the display, and/or any other information regarding one or more displays of the client device 104; input means information indicating the type of input means (e.g., keyboard, pointing device, mouse, touch screen, voice) available via the client device 104; camera information regarding one or more cameras available on the client device 104; audio input/out information regarding one or more audio I/O available on the client device 104 (e.g., microphone and speaker); application information regarding one or more applications available on the client device 104 (e.g., Photoshop®, Skeype®, Word®, etc.); and/or any other device capability information.

Returning to FIG. 1, the device capability determination component 116 may be configured to determine values of capability parameters for a client device 104 based on the device capability information obtained from the client device 104. A set of capability parameters may be configured into the device capability determination component 116 or may be obtained by the device capability determination component 116. For example, the list of capability parameters may include specified/current CPU (or baseband processor for mobile device) speed, current CPU (or baseband processor for mobile device) load, specified/current memory size, current memory usage, specified/current GPU speed, current rendering time for a frame, specified/current network speed, current network communication load, display size, display refresh rate, the range of display resolution supported, display mode supported, input means supported, camera capability, audio I/O supported, and/or any other parameters. For instances, the capability parameters may be preset by the provider, administrator, moderator, and/or any other entities related to the online game and stored in a configuration file that may be obtained by the device capability determination component 116. The device capability determination component 116 may be configured to examine the device capability information obtained by the device information component 114, extract information relevant to the set of capability parameters from the device capability information, determine the values for the capability parameters in the set, and/or any other operations. As illustration, the device capability determination component 116 may determine the values of for the CPU (or baseband processor for mobile device) speed is 1.8 GHZ, the current CPU load (or usage) is 50%, the number of currently running processes is 25, specified memory size is 2G, current memory usage is 56%, current graphics rendering time for a frame is $\frac{1}{48}$ second, network link speed is 48 Mbps, ping speed between the server 102 and client device 104 is 0.4 second, the specified display size of the client device 104 is 4.8 inch, resolution is 1080×480 pixels, the refresh rate is 48 HZ, the operating system on the client device 104 is android 5.1, and/or any other values for the device capability parameters.

Figure 3:
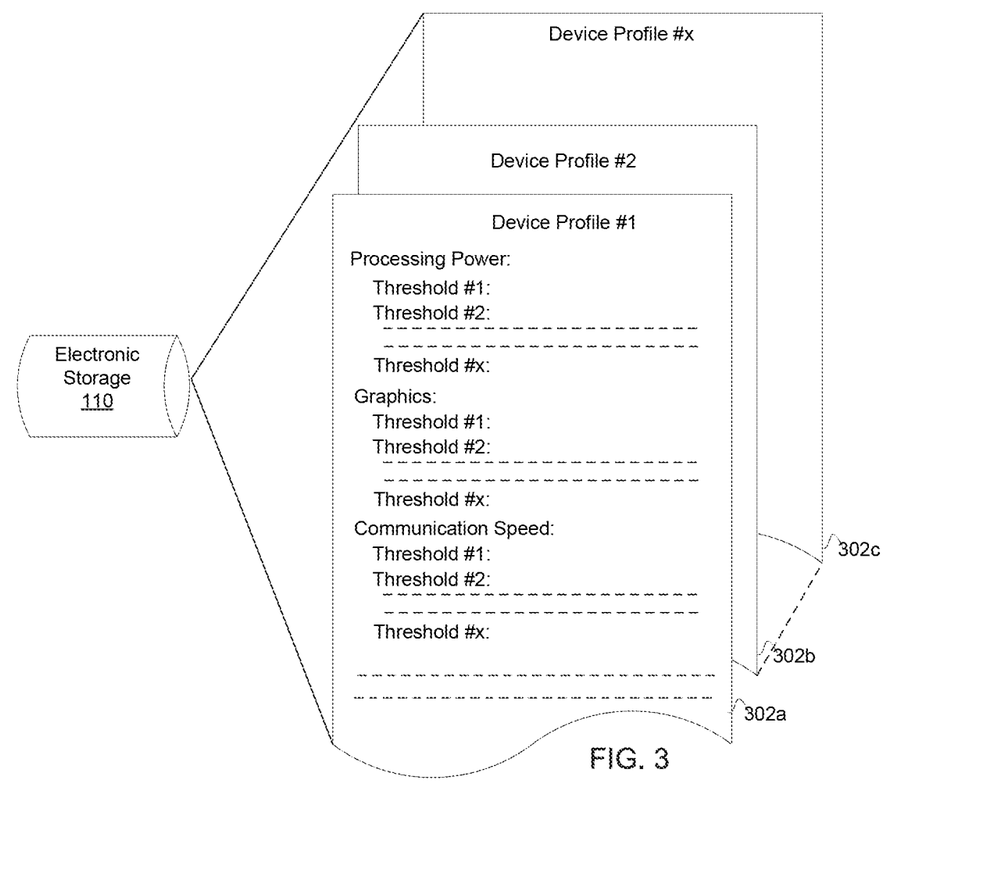
FIG. 3 illustrates exemplary device profiles for assignment to the client devices as managed by the server shown in FIG. 1.

The device profile management component 118 may be configured to manage device profiles for assignment to individual client devices 104. The device profiles managed by the device profile management component 118 may specify corresponding threshold values for the capability parameters. FIG. 3 illustrates exemplary device profiles 302 managed by device profile management component 118. As shown, the device profiles 302 managed by the device profile management component 118 may be stored and retrieved at the electronic storage 110 shown in FIG. 1. A given device profile such as profile 302a shown in FIG. 3 may specify one or more threshold values for capability parameters of different aspects such that if the values of capability parameters for a client device 104 as determined by the device information component 114 have breached one or more corresponding threshold values included in the device profile 302a, the device profile 302a may be assigned to that client device 104. As illustration, the device profile #1 as shown in this example may specify that client devices assigned to this device profiles should have CPU speed at least 1.8 GHZ, current CPU load is less than 30%, total number of currently running processes should be less than 30, GPU rendering time for a frame should be less than $\frac{1}{30}$ second, GPU load should be less than 30%, communication speed should be at least 24 Mbps, the ping speed should less than 0.5 seconds, and/or any other criteria as reflected by the threshold values included in the device profile #1.

Returning to FIG. 1, device profile assignment component 120 may be configured to determine one or more values of the capability parameters for the client device 104 have breached corresponding threshold values included in a given device profile managed by the device profile management component 118. The determination by the device profile assignment component 120 may involve comparing the values of the capability parameters with corresponding threshold values. For example, without limitation, the device profile assignment component 120 may be configured to compare the value of the CPU speed for the client device 104 as determined by the device capability determination component 116 with a CPU speed threshold value included in a device profile and determine whether the determined value of the CPU speed for the client device 104 has breached the corresponding threshold value.

The device profile assignment component 120 may be configured to assign device profile to a client device based on the determination that one or more values of capability parameters determined for the client device 104 have breached corresponding threshold values specified a given device profile. In some implementations, the device profile assignment component 120 may be configured to simply determine if all of the threshold values specified by the given device profile have been breached by the corresponding values of capability parameters as determined by the device capability determination component 116; and assign the given device profile only when this is the true. However, this is not necessarily the only case. In some implementations, the device profile assignment component 120 may be configured to use weighted sum of the determined values of the capability parameters to assign the device profile. For example, without limitation, the device profile assignment component 120 may be configured to assign scores to individual values of the determined capability parameters for the client device 104 in accordance with predetermined scoring function. As illustration, the speed of CPU of a client device 104 may be given a first score using a CPU speed scoring function, the CPU load of a client device 104 may be given a second score using a CPU load scoring function, the size of the display of the client device 104 may be given a third score using a display size scoring function, and/or may be given any other scores using any other scoring functions. The scores given to the capability parameter values may then be added by the device profile assignment component 120. In one example, the device profile assignment component 120 may be configured to assign scores to the threshold values specified by a given device profile, and compare the summed score for the determined values of the capability parameters with the summed score for the threshold values. In the case if the summed score for the determined values of the capability parameters has breached summed the score for the threshold values specified by a given device profile, the device profile assignment component 120 assign that device profile to the client device 104.

In some implementations, a subset of threshold values specified in a given device profile may be used by the device profile assignment component 120 for assigning the given device profile. As illustration, it may be preset such that if determined values of capability parameters have breached five of the threshold values in the device profile, the device profile assignment component 120 may assign that device profile to the client device 104. For instance, a priority list may be specified by provider, administrator, moderator, and/or any other entities related to the online game—the priority list may specify a number of threshold values: CPU speed greater than 1.8 GHZ, CPU less than load 30%, GPU rendering time of a frame less than $\frac{1}{30}$ second, display size greater than 4 inch, network speed greater than 24 Mbps, and any other threshold values. In that instance, the device profile assignment component 120 may assign the device profile specifying these threshold values to the client device 104 if four of the determined values of the capability parameters have breached the threshold values on the priority list.

In some implementations, the device profile assignment component 120 may assign the device profile to the client device 104 based on differences of between the values of the capability parameters determined for the client device 104 and corresponding threshold values specified in the device profile. As illustration, in those implementations, the device profile assignment component 120 may determine a difference between a determined value of a capability parameter, say CPU speed at 2.4 GHZ, with the threshold value of capability parameter specified by the device profile, say CPU speed at 1.8 GHZ; and calculate the difference between the two values, say 0.8 GHZ. In those implementations, the device profile assignment component 120 may assign the device profile based on such differences. For example, the device profile assignment component 120 may determine a weighted sum of the determined differences in a manner similar to the disclosure of weighted sum of the determined values of the capability parameters.

In some implementations, the device profile assignment component 120 may be configured to transmit the device profile assigned to the client device 104 to the client device 104 for storage and/or processing on the client device 104. For example, the device profile assignment component 120 may be configured to transmit information indicating the assigned device profile to the client device 104. In some examples, the device profile assignment component 120 may simply transmit device profile identification (ID) indicating that the device profile identified by the device profile ID has been assigned to the client device 104. In those examples, the client device 104 may be configured to store a set of device profile on the client device 104 and to retrieve any one the stored device profile using an ID.

The adjustment component 122 may be configured to adjust runtime features of the online game for a given client device 104 in accordance with the device profile assigned to the given device profile. For achieving this, a set of online game features may be associated with the given device profile such that the features of the online game is provided on the client device 104 in accordance with those features with the device profile that is assigned to the client device 104. Some examples of adjustable game features are described below for illustration.

Frame rate is a feature that defines how often the online game rendered for display on the client device 104 may be updated within a second. For example, the online game may be rendered at 24, 30, 60, 90, 120 frames per second. Typical factors that may affect the frame rate for a given client device 104 may include the refresh rate of the display of the client device 104, communication speed of client device 104, the graphics processing speed of client device 104, and/or any other factors. For instance, a typical smartphone's display has a refresh rate at 30 HZ, while a typical LCD screen for a laptop or desktop computer has refresh rate at 60 HZ. Accordingly, frame rate may be set differently for displaying the online game on a smartphone than on a laptop computer.

Level of detail of rendering is a feature that defines how much detail of the game space of is rendered for display on the client device 104. For example, the online game may be rendered at a detail level such that every facet of a building has well defined features that can be perceived by the user or rendered at a detail level such that only the front facing facet of the building has defined features that can be perceived by the user. Typical factors that may affect the level of detail of rendering the online game on or for the client device 104 may include CPU (or baseband processor for mobile devices) processing power, current CPU (or baseband processor for mobile devices) load, GPU (graphics processing unit) processing power, current GPU load, memory size, display refresh rate, frame rate, and/or any other factors. For instance, some smartphones may be equipped with more powerful and capable GPUs than some other smartphones. For those smartphones with such GPUs, the level of detail for rendering the online game for display on those smartphones may be high as compared with the level of detail for rendering the online game for display on smartphones with less power GPUs.

Level of 3D graphics is a feature that defines how much 3D graphics may be presented when displaying the online game on client device. For example, the online game may be presented on the client device 104 with 3D graphics such that the game space is presented in 3D models with highly defined features, texture, lighting, and/or visibility; or the online game may be presented on the client device such that the game space is presented in 3D models but with somewhat defined features, texture, lighting, and/or visibility; or the online game may be presented on the client device in 2D. Typical factors affect the level of 3D graphics for presenting the online game on the client device 104 may include CPU (or baseband processor for mobile device) processing power, current CPU (or baseband processor for mobile device) load, GPU (graphics processing unit) processing power, current GPU load, memory size, display refresh rate, frame rate, and/or any other factors. For instance, some smartphones may be equipped with more powerful and capable GPUs than some other smartphones. For those smartphones with such GPUs, the level of 3D graphics for presenting the online game on those smartphones may be high as compared with the level of 3D graphics for presenting the online game on smartphones with less power GPUs.

Level of collision effects is a feature that defines how collisions in the game space are simulated and presented on the client device 104. For example, the online game may be presented on the client device 104 with a realistic collision (rigid body dynamics) simulation; or may be presented on the client device with semi-realistic collision simulation. Typical factors affect the level of collision effects for presenting the online game on the client device 104 may include CPU (or baseband processor for mobile device) processing power, current CPU (or baseband processor for mobile device) load, GPU (graphics processing unit) processing power, current GPU load, memory size, and/or any other factors.

Type of animation is a feature that defines the type of animation may be implemented in the online game when presenting the online game on the client device 104. Typical types of animation implemented in a game may include sprite/texture animation, rigid body hierarchy animation, skeletal animation, morph targets, and/or any other types of animation. For example, skeletal animation permits a detailed 3D character mesh to be presented using a system of bones. As the bones move, the vertices of the 3D mesh move with them. Sprite/texture animation is a technique that places a sprite, or a single graphic image, into a large scene, and creates many of the sprite for a series scenes such that the sprite appears to be moving. Relatively speaking, skeletal animation requires more resources (e.g., GPU or CPU (or baseband processor for mobile device) processing) to be implemented in the online game than sprite/texture animation. Typical factors affect the type of animation implemented in the online game on the client device 104 may include CPU (or baseband processor for mobile device) processing power, current CPU (or baseband processor for mobile device) load, GPU (graphics processing unit) processing power, current GPU load, memory size, and/or any other factors.

Gameplay available for user interaction is a feature that defines how the user may interact with the online game via the client device 104. For example, certain gameplays involving interactions between the various entities in the game may be available on certain client devices 104, but not on others. For instance, gameplays that require tapping or touch input from users may not be available on desktop computer that uses keyboard and mouse as input device. Typical factors that affect gameplay available on the client device 104 may include input means provided by the client device 104, CPU (or baseband processor for mobile device) processing power, type of display provided by the client device 104, and/or any other factors.

Gameplay content for user interaction is a feature that may define what content are available in the online game for the user to interact. For example, certain game contents may require an associated action figure or figurine present on the client device 104. Such game content may only be available on certain client devices 104 that has the corresponding action figures or figurine available. For instance, certain game content may be implemented in the online game only when corresponding action figure(s) is detected to be present on the client device 104.

Communication mode is a feature that may define how users of the client devices 104 may communicate with each other in the online game. Certain client devices 104 may have a camera and have a fast network connection. For those client devices 104, video communication may be enabled within the online game enabling the user to chat with each other using video cameras. Certain client devices 104 may not have a camera or may not have a fast network connection. For those client devices 104, video communication may not be enabled, while textual communication may be enabled.

Physics effects available for display is a feature that defines how physics simulation in the online game may be implemented when the online game is presented on the client device 104. A physics simulation may need to be updated at a first amount of times per second in order to remain stable, at a second amount of time per second in order to appear realistic, and at a third amount of time per second in order to appear spectacular. For client devices 104 with less CPU (or baseband processor for mobile device) processing power or low display capability, the level of physics effects available for display may be set low. For client devices 104 with more CPU (or baseband processor for mobile device) processing power or high display capability, the level of physics effects available for display may be set high.

Level of audio quality is a feature that defines how audio is presented on the client devices 104 for the online game. For example, the audio library of the online game may need to be called once every $\frac{1}{60}$ second in order to keep the audio buffers filled and prevent audible glitches such that the audio quality of the online game is passable, once every $\frac{1}{30}$ second to have a good audio quality and so on. For client devices 104 with low audio output means, the level audio quality may be set low. For client devices 104 with high audio output means, the level of audio quality may be set high.

Level of artificial intelligence is a feature that defines how the artificial intelligence system of the online game may perform when the online game is presented on the client device 104. For example, a non-user character's artificial intelligence system may need to "think" at least once every second to prevent the appearance of stupidity, at least three times every second to appear responsive, at least 5 times every second to appear intelligent, and so on. For client devices 104 with low CPU (or baseband processor for mobile device) processing power, the level of artificial intelligence (e.g., how often the non-character's artificial intelligence system thinks) may be set low. For client device 104 with high CPU (or baseband processor for mobile device) processing power, the level of artificial intelligence may be set high.

Figure 4:
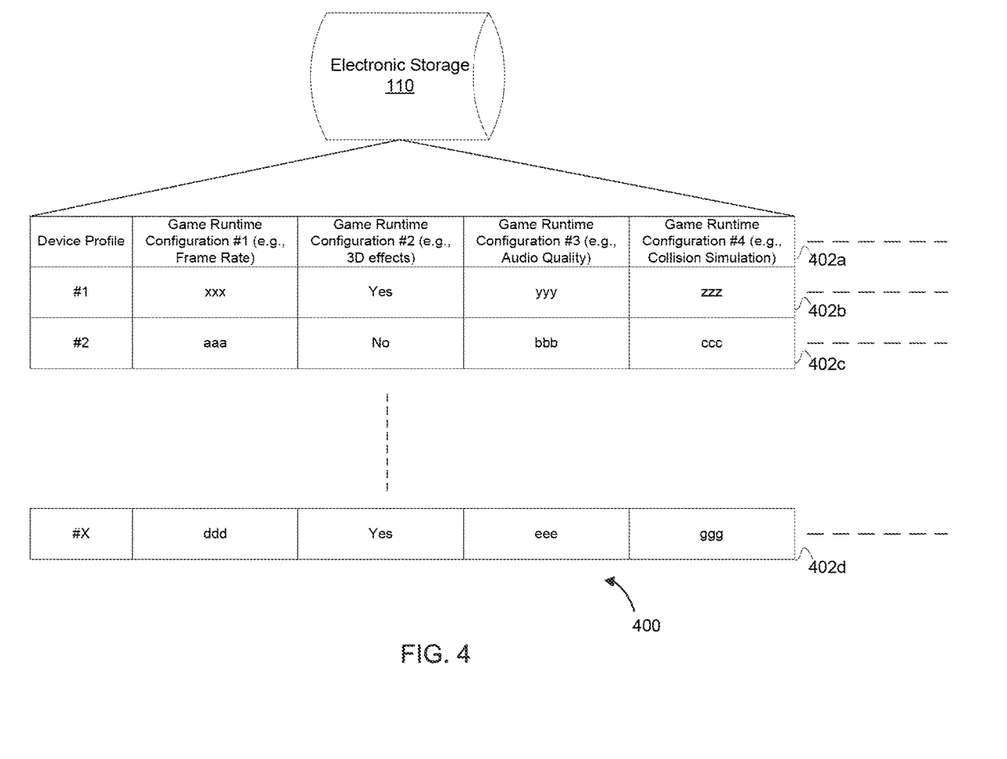
FIG. 4 illustrates one example of associating device profiles with one or more online game features in accordance with one embodiment of the disclosure.

FIG. 4 illustrates one example of associating device profiles with one or more online game features in accordance with one embodiment of the disclosure. As shown, a relational table 400 may be used to associate online game features to corresponding device profiles. In accordance with the table 400 shown in FIG. 4, the adjustment component 122 may adjust the implementation of the online game on the client device 104. For example, as illustration, if a client device 104 is assigned to device profile #1 at a first time point T, the adjust component 122 may adjust the online game features in accordance with row 402a such that the frame rate of online game is set to a first rate, the 3D graphics effects of the online game is turned on, the audio quality of the online game is set to a first quality, the collision simulation in the online game is set to a first level, and/or any other feature settings. At a time point T+1, the client device 104 may be assigned to device profile #2: for example, the CPU load of the client device 104 has increased from that at time T and/or the actual rendering time of a frame on client device 104 has slowed to $\frac{1}{20}$ second as compared to that of time T when the rendering time of the frame was $\frac{1}{30}$. In accordance with table 400— i.e., row 402b, the adjustment component 122 may adjust the online game features in accordance with the game features specified in row 402b such that the frame rate of the online game is set to a second rate, the 3D graphics effects is turned off, the audio quality of the online game is set to a second quality, the collision simulation in the online game is set to a second level, and/or any other feature settings.

The server 102, client devices 104, and/or external resources 106 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which servers 102, client devices 104, and/or external resources 106 may be operatively linked via some other communication media.

A given client device 104 may include one or more processors configured to execute computer program components. The computer program components may be configured to enable an expert or user associated with the given client device 104 to interface with system 100 and/or external resources 106, and/or provide other functionality attributed herein to client devices 104. By way of non-limiting example, the given client device 104 may include one or more of a desktop computer, a laptop computer, a handheld computer, a tablet computing platform, a NetBook, a Smartphone, a gaming console, and/or other computing platforms.

The external resources 106 may include sources of information, hosts and/or providers of virtual environments outside of system 100, external entities participating with system 100, and/or other resources. In some implementations, some or all of the functionality attributed herein to external resources 106 may be provided by resources included in system 100.

The server 102 may include electronic storage 110, one or more processors 108, and/or other components. The server 102 may include communication lines or ports to enable the exchange of information with a network and/or other computing platforms. Illustration of server 102 in FIG. 1 is not intended to be limiting. The server 102 may include a plurality of hardware, software, and/or firmware components operating together to provide the functionality attributed herein to server 102. For example, server 102 may be implemented by a cloud of computing platforms operating together as server 102.

Electronic storage 110 may comprise electronic storage media that electronically stores information. The electronic storage media of electronic storage 110 may include one or both of system storage that is provided integrally (i.e., substantially non-removable) with server 102 and/or removable storage that is removably connectable to server 102 via, for example, a port (e.g., a USB port, a FireWire port, etc.) or a drive (e.g., a disk drive, etc.). Electronic storage 110 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 110 may include one or more virtual storage resources (e.g., cloud storage, a virtual private network, and/or other virtual storage resources). Electronic storage 110 may store software algorithms, information determined by processor 108, information received from server 102, information received from client devices 104, and/or other information that enables server 102 to function as described herein.

Processor(s) 108 is configured to provide information processing capabilities in server 102. As such, processor 108 may include one or more of a digital processor, an analog processor, a digital circuit designed to process information, an analog circuit designed to process information, a state machine, and/or other mechanisms for electronically processing information. Although processor 108 is shown in FIG. 1 as a single entity, this is for illustrative purposes only. In some implementations, processor 108 may include a plurality of processing units. These processing units may be physically located within the same device, or processor 108 may represent processing functionality of a plurality of devices operating in coordination. The processor 108 may be configured to execute components 112, 114, 116, 118, 120, 122, and 124. Processor 108 may be configured to execute components 112, 114, 116, 118, 120, and 122, 124 by software; hardware; firmware; some combination of software, hardware, and/or firmware; and/or other mechanisms for configuring processing capabilities of processor 108.

It should be appreciated that although components 112, 114, 116, 118, 120, 122 are illustrated in FIG. 1 as being co-located within a single processing unit, in implementations in which processor 108 includes multiple processing units, one or more of components 112, 114, 116, 118, 120, 122 may be located remotely from the other components. The description of the functionality provided by the different components 112, 114, 116, 118, 120, 122 described below is for illustrative purposes, and is not intended to be limiting, as any of components 112, 114, 116, 118, 120, 122 may provide more or less functionality than is described. For example, one or more of components 112, 114, 116, 118, 120, 122 may be eliminated, and some or all of its functionality may be provided by other ones of components 112, 114, 116, 118, 120, 122. As another example, processor 108 may be configured to execute one or more additional components that may perform some or all of the functionality attributed below to one of components 112, 114, 116, 118, 120, 122.

Figure 5:
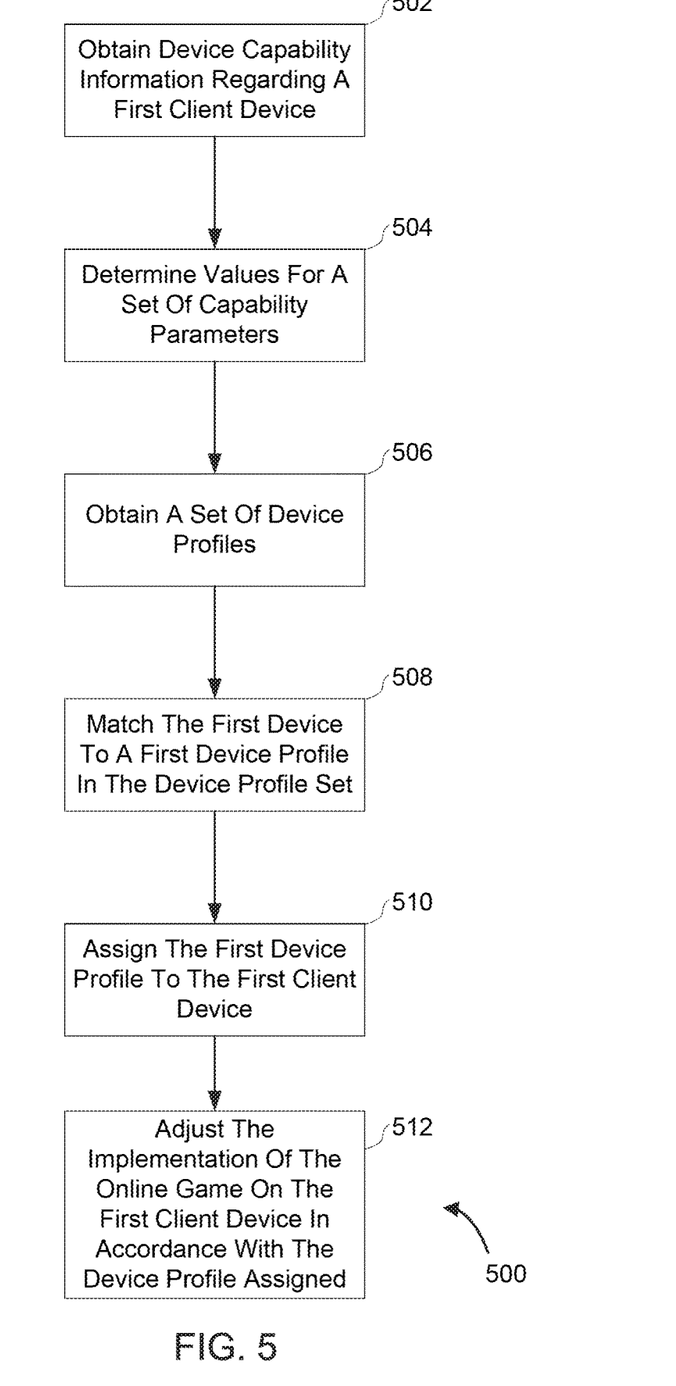
FIG. 5 illustrates one exemplary method for providing online games on individual client devices based on capability of the client devices in accordance with the disclosure.

FIG. 5 illustrates one exemplary method 500 for providing online games on individual client devices based on capability of the client devices in accordance with the disclosure. The operations of method 500 presented below are intended to be illustrative. In some embodiments, method 500 may be accomplished with one or more additional operations not described, and/or without one or more of the operations discussed. Additionally, the order in which the operations of method 500 are illustrated in FIG. 5 and described below is not intended to be limiting.

In some embodiments, method 500 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 500 in response to instructions stored electronically on an electronic storage medium. The one or more processing devices may include one or more devices configured through hardware, firmware, and/or software to be specifically designed for execution of one or more of the operations of method 500.

At an operation 502, device capability information regarding a first client device may be obtained. Obtaining device capability information regarding the first client device at 502 may involve communicating with the first client device, detecting if the first client device has transmitted information indicating its capabilities, parsing received client device information regarding the first client device, and/or any other operations. In some implementations, the device capability information regarding the first client device may be passively obtained from the client devices in a "push" mode at 502. In some implementations, the device capability information regarding the first client device may be obtained from the client device in a "poll" mode at 502. In some implementations, the device capability information regarding the first client device may be intermittently obtained from client devices. In some implementations, operation 502 may be performed by a device information component the same as or similar to device information component 114 (shown in FIG. 1 and described herein).

At an operation 504, values for a set of capability parameters may be determined based on the device capability information regarding the first client device obtained at operation 502. In some implementations, operation 504 may be performed by device capability determination component the same as or similar to device capability determination 116 (shown in FIG. 1 and described herein).

At an operation 506, a set of device profiles may be obtained. The device profiles obtained at 506 may specify threshold values preset for device capability parameters. In some implementations, operation 506 may be performed by a device profile management component the same as or similar to probability item device profile management component 118 (shown in FIG. 1 and described herein).

At an operation 508, a first device profile may be matched to the first client device based on the values of the set of capability parameters determined at 504 and the threshold values for the capability values specified in the first client device profile. This may involve comparing the values of the set of capability parameters determined at 504 with corresponding threshold values specified in the first client device profile. In some implementations, operation 508 may employ weighted sum of the determined values of the set of capability parameters to match the first device profile to the first client device. In some implementations, a subset of threshold values specified in a the first client device profile may be employed by operation 508 to match the first device profile to the first. In some implementations, operation 508 may be performed by device profile assignment component the same as or similar to device profile assignment component 120 (shown in FIG. 1 and described herein).

At an operation 510, the first device profile may be assigned to the first client device. In some implementations, operation 510 may involve transmitting the first device profile to the first client device for storage and/or implementation of the online game. In some implementations, operation 510 may involve recording an association between the first client device and first device profile in a relational table stored in a database related to the online game. In some implementations, operation 510 may be performed by a device profile assignment component the same as or similar to device profile assignment component 120 (shown in FIG. 1 and described herein).

At an operation 512, the implementation of the online game n the first client device may be adjusted in accordance with the first device profile assigned to the first client device. Some examples of game features that may be adjusted at operation 512 may include frame rate, level of detail of rendering, level of 3D graphics, level of collision effects, animation type, gameplay available for user interaction, gameplay content for user interaction, communication mode, physics effects available for display, level of artificial intelligence, and/or any other features of the online game In some implementations, operation 512 may be performed by an adjustment component the same as or similar to adjustment component 122 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system for presenting an online game on client devices based on particular capabilities of the client devices, wherein the client devices include a first client device and a second client device, the system comprising one or more physical processors configured by machine-readable instructions to:
    obtain first capability information regarding a first set of capabilities of the first client device, wherein the first set of capabilities include one or more hardware-based device-specific capabilities of the first client device;
    obtain second capability information regarding a second set of capabilities of the second client device, wherein the second set of capabilities include one or more hardware-based device-specific capabilities of the second client device;
    determine a first value of a first capability parameter based on the first capability information;
    determine a second value of a second capability parameter based on the second capability information;
    automatically make a selection, by the one or more physical processors, of one or more software-controllable game-specific settings that control presentations of the online game on the client devices, wherein the one or more software-controllable game-specific settings include at least one of
        (i) a frame rate for rendering the online game,
        (ii) a level of detail for rendering the online game,
        (iii) an audio quality for presenting the online game,
        (iv) a level of graphic effects for presenting the online game, and
        (v) a level of physics effects for presenting the online game, wherein the selection is based on both the first value of the first capability parameter and the second value of the second capability parameter; and
    present the online game on the first client device and on the second client device in accordance with the selection, wherein presenting the online game includes a first presentation of the online game on the first client device and a second presentation of the online game on the second client device, wherein the first presentation of the online game is controlled by the one or more software-controllable game-specific settings of the selection, and wherein the second presentation of the online game is controlled by the one or more software-controllable game-specific settings of the selection.

2. The system of claim 1, wherein the selection is based on which of the first client device and second client device has a lower value for the first capability parameter or the second capability parameter.

3. The system of claim 1, wherein the one or more physical processors are further configured to:
    determine whether the first value of the first capability parameter has breached a first threshold value for the first capability parameter; and
    transmit the first value of the first capability parameter to the first client device.

4. The system of claim 3, wherein the one or more physical processors are further configured to make a second determination whether the second value of the second capability parameter has breached a second threshold value for the second capability parameter, and wherein the selection is further based on the second determination.

5. The system of claim 4, wherein the selection is further based on a weighted sum of the first threshold value and the second threshold value.

6. The system of claim 4, wherein the selection is further based on a difference between the first value of the first capability parameter and the first threshold value, and a second difference between the second value of the second capability parameter and the second threshold value.

7. The system of claim 1, wherein the first capability information is obtained intermittently, and wherein the first value of the first capability parameter is determined intermittently subsequent to the first set of capabilities of the first device being obtained intermittently.

8. The system of claim 7, wherein the first capability information is obtained after a first event has been completed in the online game by a first user associated with the first client device.

9. The system of claim 1, wherein the one or more hardware-based device-specific capabilities of the first client device include at least one of processing power of the first client device, graphics processing speed of the first client device, display capability of the first client device, current transmission speed of the first client device, and remaining battery power of the first client device, wherein the one or more hardware-based device-specific capabilities of the second client device include at least one of processing power of the second client device, graphics processing speed of the second client device, display capability of the second client device, current transmission speed of the second client device, and remaining battery power of the second client device.

10. A method for presenting an online game on client devices based on particular capabilities of the client devices, wherein the client devices include a first client device and a second client device, the method being implemented in one or more physical processors configured to execute machine-readable instructions, the method comprising:
  obtaining first capability information regarding a first set of capabilities of the first client device, wherein the first set of capabilities include one or more hardware-based device-specific capabilities of the first client device;
  obtaining second capability information regarding a second set of capabilities of the second client device, wherein the second set of capabilities include one or more hardware-based device-specific capabilities of the second client device;
  determining a first value of a first capability parameter based on the first capability information;
  determining a second value of a second capability parameter based on the second capability information;
  automatically making a selection of one or more software-controllable game-specific settings that control presentations of the online game on the client devices, wherein the one or more software-controllable game-specific settings include at least one of
    (i) a frame rate for rendering the online game,
    (ii) a level of detail for rendering the online game,
    (iii) an audio quality for presenting the online game,
    (iv) a level of graphic effects for presenting the online game, and
    (v) a level of physics effects for presenting the online game, wherein the selection is based on both the first value of the first capability parameter and the second value of the second capability parameter; and
  presenting the online game on the first client device and on the second client device in accordance with the selection, wherein presenting the online game includes a first presentation of the online game on the first client device and a second presentation of the online game on the second client device, wherein the first presentation of the online game is controlled by the one or more software-controllable game-specific settings of the selection, and wherein the second presentation of the online game is controlled by the one or more software-controllable game-specific settings of the selection.

11. The method of claim 10, wherein the selection is based on which of the first client device and second client device has a lower value for the first capability parameter or the second capability parameter.

12. The method of claim 10, further comprising:
  determining whether the first value of the first capability parameter has breached a first threshold value for the first capability parameter; and
  transmitting the first value of the first capability parameter to the first client device.

13. The method of claim 12, further comprising:
  making a second determination whether the second value of the second capability parameter has breached a second threshold value for the second capability parameter, and wherein the selection is further based on the second determination.

14. The method of claim 13, wherein the selection is further based on a weighted sum of the first threshold value and the second threshold value.

15. The method of claim 13, wherein the selection is further based on a difference between the first value of the first capability parameter and the first threshold value, and a second difference between the second value of the second capability parameter and the second threshold value.

16. The method of claim 10, wherein the first capability information is obtained intermittently, and wherein the first value of the first capability parameter is determined intermittently subsequent to the first set of capabilities of the first device being obtained intermittently.

17. The method of claim 16, wherein the first capability information is obtained after a first event has been completed in the online game by a first user associated with the first client device.

18. The method of claim 10, wherein the one or more hardware-based device-specific capabilities of the first client device include at least one of processing power of the first client device, graphics processing speed of the first client device, display capability of the first client device, current transmission speed of the first client device, and remaining battery power of the first client device, wherein the one or more hardware-based device-specific capabilities of the second client device include at least one of processing power of the second client device, graphics processing speed of the second client device, display capability of the second client device, current transmission speed of the second client device, and remaining battery power of the second client device.

* * * * *